United States Patent
Tillmann et al.

(10) Patent No.: US 7,500,226 B2
(45) Date of Patent: Mar. 3, 2009

(54) EFFICIENT CHECKING OF STATE-DEPENDENT CONSTRAINTS

(75) Inventors: Nikolai Tillmann, Redmond, WA (US); Wolfgang Grieskamp, Redmond, WA (US); Wolfram Schulte, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 597 days.

(21) Appl. No.: 10/792,555

(22) Filed: Mar. 2, 2004

(65) Prior Publication Data

US 2005/0198621 A1 Sep. 8, 2005

(51) Int. Cl.
G06F 9/44 (2006.01)
G06F 11/00 (2006.01)

(52) U.S. Cl. .......................... 717/126; 717/127; 714/38

(58) Field of Classification Search ................. 717/126, 717/127; 714/38
See application file for complete search history.

(56) References Cited

U.S. PATENT DOCUMENTS

| | | | | |
|---|---|---|---|---|
| 5,133,068 A * | 7/1992 | Crus et al. | ................... | 707/100 |
| 5,323,316 A * | 6/1994 | Kadashevich et al. | .......... | 704/9 |
| 5,832,270 A * | 11/1998 | Laffra et al. | ................. | 717/125 |
| 5,838,976 A * | 11/1998 | Summers | ..................... | 717/130 |
| 5,862,379 A * | 1/1999 | Rubin et al. | ................. | 717/109 |
| 5,923,878 A * | 7/1999 | Marsland | ..................... | 717/139 |
| 6,061,518 A * | 5/2000 | Hoffman | ..................... | 717/124 |
| 6,266,805 B1 * | 7/2001 | Nwana et al. | ................ | 717/104 |
| 6,675,379 B1 * | 1/2004 | Kolodner et al. | ............. | 717/155 |
| 6,854,073 B2 * | 2/2005 | Bates et al. | .................... | 714/38 |
| 6,952,214 B2 * | 10/2005 | Naegle et al. | ................ | 345/506 |
| 2003/0110474 A1 * | 6/2003 | Ur et al. | ...................... | 717/131 |
| 2003/0159132 A1 | 8/2003 | Barnett et al. | | |
| 2004/0054569 A1 * | 3/2004 | Pombo et al. | ................... | 705/7 |
| 2005/0050536 A1 | 3/2005 | Grieskamp et al. | | |
| 2005/0160404 A1 | 7/2005 | Nachmanson et al. | | |

OTHER PUBLICATIONS

Freeman-Benson, B. N., Maloney, J., and Borning, A. 1990. An incremental constraint solver. Commun. ACM 33, 1 (Jan. 1990), 54-62.*

Safonov et al., "Lessons from the Neighborhood Viewer: Building Innovative Collaborative Applications", Jul. 1996, Proceedings of the Fourth Annual USENIX Tcl/Tk Workshop, Monterey, CA, 12 pages.*

Blelloch, An interactive tutorial for NESL, Archived Dec. 2, 1998 at <http://web.archive.org/web/19981202072857/http://www.cs.cmu.edu/~scandal/nesl/tutorial2.html>, Accessed and printed Mar. 29, 2007.*

(Continued)

*Primary Examiner*—Tuan Q Dam
*Assistant Examiner*—James Rutten
(74) *Attorney, Agent, or Firm*—Klarquist Sparkman, LLP

(57) ABSTRACT

Constraints are defined in view of a program implementation. Constraints check program state or variables to maintain data consistency. A constraint component determines a constraint's scope and variables upon which a constraint depends. Program flow is altered so constraints are checked whenever a variable upon which a constraint depends is updated. Optionally, program flow is altered dynamically to re-establish constraints whenever a variable upon which a constraint depends is updated. Re-establishing constraints provides efficiency, since a program flow is altered for a minimum cost based on a present evolving minimum set of active constraint-variable relationships.

18 Claims, 12 Drawing Sheets

OTHER PUBLICATIONS

Börger, Egon and Stärk, Robert, "Basic ASMs", Abstract State Machines—A Method for High-Level System Design and Analysis, Chapter 3, 2003, 73 pages.

Chomicki, Jan, "Efficient Checking of Temporal Integrity Constraints Using Bounded History Encoding", ACM Transactions on Database Systems, vol. 20, No. 2, Jun. 1995, 38 pages.

Godfrey, Parke and Grant, John and Gryz, Jarek and Minker, Jack, "Integrity Constraints: Semantics and Applications", Logics for Databases and Information Systems, Chapter 9, 1998, 42 pages.

Grefen, Paul and Widom, Jennifer; "Protocols for Integrity Constraint Checking in Federated Databases", 1996, 19 pages.

Grefen, Paul and Widom, Jennifer, "Integrity Constraint Checking in Federated Databases", CoopIS '96, 1996, 12 pages.

Gupta, Ashish and Widom, Jennifer, "Local Verification of Global Integrity Constraints in Distributed Databases", ACM SIGMOD International Conference on Management of Data, 1993, 12 pages.

Gupta, Ashish and Sagiv, Yehoshua and Ullman, Jeffrey D. and Widom, Jennifer; "Constraint Checking with Partial Information", PODS '94, 1994, 12 pages.

Gurevich, Yuri, "Evolving Algebras 1993: Lipari Guide", Specification and Validation Methods, 1995, 18 pages.

Gurevich, Yuri and Tillmann, Nikolai, "Partial Updates: Exploration", undated, 45 pages.

Gurevich, Yuri and Tillmann, Nikolai, "Partial Updates Exploration II", Abstract State Machines 2003—Advances in Theory and Practice, 10th International Workshop, ASM 2003, 20 pages.

Meyer, Bertrand, "Eiffel the Language", Chapters 1, 9 and 29, 1992, 44 pages.

Milano, Michela and Ottosson, Greger and Refalo, Philippe and Thorsteinsson, "The Benefits of Global Constraints for the Integration of Constraint Programming and Integer Programming", Proceedings of the Seventeenth National Conference on Artificial Intelligence, Jul. 2000, 8 pages.

Verheecke-Ragnhild Van Der Straeten, Bart, "Specifying and Implementing the Operational Use of Constraints in Object-Oriented Applications", Copyright© 2002, Australian Computer Society, Inc., 10 pages.

Wüthrich, Beat, "On Consistency Checking in Deductive Databases", Federal Institute of Technology, 1990, 16 pages.

* cited by examiner

FIG. 5

```
Update (variable, value)
    boolean X as true;
    case variable = = i                    ← 502
        X: = (value ≤ MaxInt);
    case variable = = MaxInt               ← 504
        X: = (i ≤ value);
    if X = = false                         ← 506
        throw constraint exception
    else
        variable: = value;                 ← 508
end;
```

FIG. 6

```
var MaxInt = 1000
var i as Integer = 0 var active as boolean = false
                              ↖602    ↙604
    boolean constraint A ( )
        if active then (i ≤ MaxInt)
        else true;
                                          ↖610
    main ( )
        i: = 2;
        •
        •
        •
        active: = true;
                          ↖608
        •
        •
        •
        i: = 5;
        •
        •
        •
        maxInt: = 4
    end;
```

EFFICIENT CHECKING OF STATE-DEPENDENT CONSTRAINTS

TECHNICAL FIELD

The technical field relates to maintaining data consistency with state dependent constraints, and more particularly, driving constraint checks via update attempts made to variables upon which constraints depend.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

One of the most important aspects of software development is program testing and verification. Testing involves determining whether software executes according to intended behavior. For example, Eiffel is a programming language with language constructs such as pre-conditions, post-conditions, or constraints (i.e., constraints). In one such example, a software developer writes constraints in source code such as a precondition before a method call, a post-condition after a method call, or other constraint elsewhere in the program. In such examples, the constraints are checked only at particular points in the program as dictated by their placement in the source code, such as before or after a call to the function. However, within the function or elsewhere in the program, the executing program can violate the constraints and make errors, and then only when the constraint statement is run does the error become evident. Additionally, every time this particular point in the program is encountered, the constraint is evaluated, even when variables associated with a constraint remain unchanged. Under these existing approaches, the constraint condition is verified every time the constraint is encountered in the program flow. Thus, constraints are only checked where indicated by the source programmer, and the constraint is always run at that point even when no state change has been made that might violate the constraint. Additionally, if a state or variable is changed elsewhere in the program where no constraint evaluation statement appears, then this constraint violation would go undetected. Thus, existing methods for checking constraints are both under-inclusive and over-inclusive.

SUMMARY

The described technologies provide methods and systems for providing efficient constraint checking via updates made to variables upon which constraints depends.

In one example, the constraint is declared as a condition that should hold as the variables associated with the constraint are updated. The constraint is broken down into variables accessed in evaluating the constraint. The executable code is compiled with, injected with, or executed in a runtime that asserts the constraint each time one of the variables associated with the constraint is updated. In this way, a programmer defines a constraint, but is free from determining where in the code it is necessary to evaluate the constraint. Additionally, a constraint is only evaluated when necessary instead of whenever encountered in source code. Since a constraint can be violated when the variables associated with the constraint are updated, the executable code is augmented so that the constraint is asserted in association with these variable updates.

In another example, upon an update of a variable, when a variable has information indicating it has an associated constraint, the constraint is reestablished again. Given a set of variables, one or more constraints may be associated with each of the variables. In one example, a method finds the constraints associated with a variable, then removes and establishes the constraints again. Establishing the constraint includes the assertion of the constraint in the changed state. The set of variables that are accessed during the evaluation of the constraint in the changed state might be different from the set of variables that were accessed during the evaluation of the constraint in a previous state. In such a case, by reestablishing a constraint, the set of accessed variables change and information is attached to the new variables about the constraint. Thus, variables with associated constraint relationships change dynamically, and updates on variables indicating a constraint cause constraints to be reasserted. Each reassertion not only verifies a constraint(s), but reestablishes and associates variables to constraints dynamically. Such a dynamic constraint-variable environment provides efficient constraint checking whereby constraints remain as long as needed so execution costs are commensurate with required conditions.

Additional features and advantages will be made apparent from the following detailed description, which proceeds with reference to the accompanying drawings.

BRIEF DESCRIPTION OF THE DRAWINGS

FIG. 5 is a program listing of an exemplary method that determines whether a constraint holds.

FIG. 6 is a program listing of a constraint that changes during program execution.

DETAILED DESCRIPTION

Overview

Figure 1:
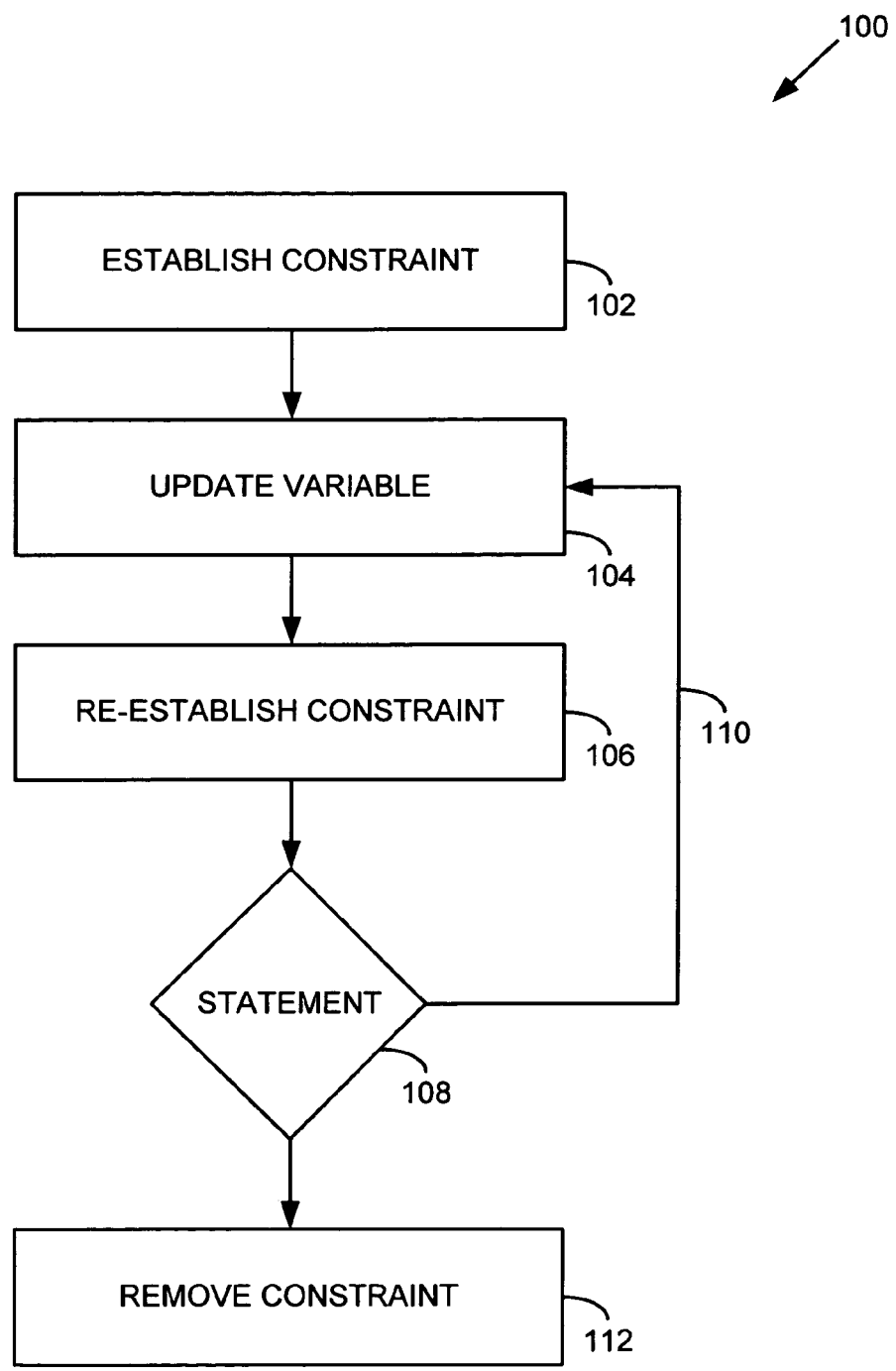
FIG. 1 is a flowchart for an exemplary method for checking constraints.

Debugging and testing a program often involves examining the state of the program including the values of its variables. The described technologies provided methods and systems for detecting program errors. In one example, a programmer conceives and writes constraints that represent allowable values and conditions for program state. In one example, a constraint evaluates program state in the form of a Boolean-valued expression(s) that express program state conditions. The Boolean-value expression indicates (e.g., true or false) whether a desired program state is satisfied.

The life or existence of a constraint in a program varies, for example, as defined by a programmer. In one example, a constraint(s) is unrestricted and thus remains during program execution. In another example, a constraint is defined or bound by scopes of the program (e.g., procedures, modules, etc.). In yet another example, a constraint is bound to life-time of an object (e.g., a savings' account object, a customer object, etc.). In any such case, a constraint can be enforced during testing and/or remain in force after a program's release. In one such example, constraints remain in shipped software thereby detecting and preventing data corruption in a released program. In one example, information about a constraint violation is sent automatically to the manufacturer or designated administrative entity over a network link.

For example, ensuring consistency of data is crucial during the debugging process of an application, and desirable even in released applications to prevent further damage to data. In today's practice, programmers write sanity checks ("asserts") into the source code, and those assert conditions are verified only where written in the source code by the programmer. Instead, the described technology provides efficient methods and systems for more continuous checking of data consistency. Further, because constraints are checked more consistently than just where a programmer writes assert statements in the source code, the technology provides finer granularity for determining where inconsistency arises. Often the inconsistency can be determined at the precise point where the data corruption would otherwise have occurred.

In one example, the constraint is declared as a condition that should hold as the variables associated with the constraint are updated. The constraint is broken down into variables accessed in evaluating the constraint. The executable code is compiled with, injected with, or executed in a runtime that asserts the constraints each time one of the variables associated with the constraint is updated. In this way, a programmer defines a constraint, but is free from determining where in the code it is necessary to evaluate the constraint. Additionally, a constraint is only evaluated when necessary instead of whenever encountered in source code. Since a constraint can only be violated when the variables associated with the constraint are updated, the executable code or intermediate language code is augmented so that the constraint is asserted in association with these variable updates.

In the past, in order to check a constraint, prior systems would access state or variables in order to evaluate constraints. However, they did not keep track of updates to specific individual variables in order to determine whether allowing an update to one of those specific variables would violate a constraint. Instead, the state was viewed as one big black box and whenever something could potentially have entered an undesirable state, and a programmer wanted to check the consistency of the state, they would insert constraint source code in the program of that particular point in the program flow, whereas in the described technology, a subset of the program state is viewed as individual variables, and any updates made to those specific variables triggers the evaluation of exactly those constraints which rely on those variables at any point of time.

Since debugging, testing, and maintaining data consistency amounts to a significant portion of the time and resources spent in the development and maintenance of software, the described technologies provide a significant advantage, for example, by detecting errors early or finding a cause of an error. In released applications, reducing data corruption helps maintain the value of accumulated information. The described technology allows preventing certain data corruption altogether by detecting potential violations of specified constraints.

In many respects, the state of a program includes the values of its variables. For example, there are global variables (e.g., "static"), local variables (e.g., within methods, procedures, etc.), and or object variables (e.g., properties or fields in objects). As described herein, a program or test developer conceives of conditions or relationships (e.g., "constraints") that should be evaluated for a program under consideration. A constraint is a condition or relationship evaluated based on a program's state. In one such example, a constraint is a condition or relationship on one or more variables and or constants. In another example, a constraint is a relationship between one or more variables or constants, and one or more other variables and or constants. In other examples, a constraint represents a condition or relationship involving multiple constants and or multiple variables, for example in an equation. If the constraint evaluates to an expected or preferred value then the program is in a state consistent with that constraint. Of course, variables and constants are known to hold values of all data types (e.g., real numbers, integers, strings, sets, instances of object or class types, etc.). A variable is a part of the evolving state of the program or model or system. It holds a value at each point of time, but it may hold a different value at different points of time.

In one such example, a programmer conceives of and writes in source code a constraint for a program in the form of an expression which evaluates to a boolean value, including the truth values "true" and "false". The expression represents a condition that must hold, i.e., evaluate to "true", for some scope of the program. In one example, if the constraint is a global constraint, the described technology reduces the constraint to executable instructions in the code that monitor and maintain the constraint during execution. Thus, a constraint remains satisfied during an indicated scope. In another example, the programmer writes a constraint specification that is compiled and injected into the program thereby monitoring the constraint. In another example, a programmer creates constraints in a debugger program and the executing debugger indicates when the constraint is violated (i.e., it evaluates to "false"). Those skilled in the relevant art will recognize that the described technology is not limited to any such described use but is readily adaptable where state of a program or model or system is present and evolving.

For example, a constraint on a savings account could require that the balance is never negative. In another example, a constraint requires that the sum of balances of a group of accounts owned by a same customer remain above zero. This would allow an institution to allow a customer to maintain a negative account balance so long as the customer's aggregate accounts never become negative. Another constraint could make sure that certain objects never become part of a set of objects. As will be immediately apparent to those in the computing arts, the kinds of constraints that a programmer may decide to assert are numerous and diverse in nature for all data and or object types.

In one example, the described technology maintains the constraint conditions in several possible ways. In one example, the technology performs certain behaviors when establishing a new constraint, when removing a constraint, and or when checking a constraint upon a variable update. In one example, when a constraint is established, the constraint is evaluated as the technology accesses the variables associated with the constraint. While establishing the constraint, if the constraint evaluation yields the value "false", then the constraint is violated. Optionally, when a constraint is violated, an error-handling procedure is activated. For example, a message may be sent to the terminal indicating a constraint violation occurred or was attempted. Otherwise, the set of variables that is accessed during the evaluation of the constraints is recorded. Then, information is associated with those variables indicating that the constraint depends on those variables. In other examples, a variable may have information indicating that not only one but several constraints depend on it. In one example, an efficient implementation of this operation attaches information about all variables a constraint depends on to the constraint.

In another example, when a constraint is removed (e.g. because its life-time has expired), information attached to variables associated with the constraint is removed. Additionally, in another example, when the value of a variable is updated, and attached to the variable is information that a constraint(s) depends on it, that constraint(s) is removed and established again. In this example, an accessed variable associated with a constraint will cause all variables associated with the constraint to be reasserted and evaluated again. Reasserting and evaluating constraints is helpful, for example, in an environment when constraints (and or the variables associated therewith) are changing dynamically.

Various kinds of error-handling procedures are possible. For example, an exception can be thrown if the underlying framework supports exceptions (i.e. the Microsoft CLR, Microsoft .NET, or Java virtual machine, or the C++ runtime system). In another example, the program is terminated upon a constraint violation. In another example, a constraint violation is determined before the program enters a state violating the constraint and the since the program is not allowed to enter the unacceptable state, the program remains consistent and continues.

In another example, the variables accessed during the evaluation of a constraint are monitored using different or other means. For example, a compiler of a high-level language (e.g., C#) generates special monitoring-code for the variables that appear in constraints. In another example, a tool can alter the machine instructions generated by a compiler by inserting monitoring code. In another example, an underling machine such as a processor or a virtual machine (i.e., Microsoft .NET, Java virtual machine) performs the monitoring.

In another example, updates on variables, that also appear in constraints, are intercepted by different or other means. In some languages such as sequential languages (e.g., C#, C++, Java), code can be generated by a compiler so that an update of variables associated with constraints triggers checking a dependent constraint(s). In other languages, that allow parallel updates of variables or similar features, a set of variables can be updated at once, and code can be generated to trigger checking of all dependent constraints. As stated earlier in one example, when a variable has information indicating it has an associated constraint, the constraint is reestablished again (e.g., information attached to associated variables). Thus, given a set of variables, one or more constraints may be associated with each of the variables. In one example of a set of variables, a method finds all the associated one or more constraints, then removes and establishes the constraints again. Establishing the constraint includes the assertion of the constraint in the changed state. The set of variables that are accessed during the evaluation of the constraint in the changed state might be different from the set of variables that were accessed during the evaluation of the constraint in a previous state. In such a case, by reestablishing a constraint, the accessed variables change and information is attached to the new variables about the constraint. Thus, variables with associated constraint relationships change dynamically, and only variables indicating a constraint cause constraints to be reasserted. Each reassertion not only verifies a constraint(s), but reestablishes and associates variables to constraints dynamically. Such a dynamic constraint-variable environment provides efficient constraint checking whereby constraints remain only as long as needed so execution costs are commensurate with required conditions.

In another example, constraint checking is suppressed (e.g. with a source code begin and end scope delineation) by means of syntactical scopes. An example scope would not exclude atomic expressions or transactions. When such a scope is entered, information is attached to a constraint(s) indicating that its checking is temporarily disabled. When a disabled constraint would otherwise be checked because a variable upon which it depends is changed, then the constraint is not checked, but further information is attached to it indicating that it needs to be checked later when the scope is left. Upon exiting such a scope, the information indicating temporary disablement is removed, and the constraint is removed and reestablished.

In such examples, data corruption can be prevented. For example, when a variable upon which a constraint depends is about to be updated, the old value of the variable is stored, and after evaluating the constraint with the updated variable value, if the constraint is violated, the old value is reinstated, thereby returning to the consistent state. In another example, the old value is not changed, but a temporary variable is changed. After evaluating the constraint with the temporary variable(s), updates to the variable(s) is performed if the constraint is true. When the evaluation yields "false", the attempted data-corruption is signaled to the program (e.g. by throwing an exception, sending a message to a terminal, administrator, or software manufacturer). In either such example, the program can then abort the faulty operation, or allow the user to continue with the consistent data.

Exemplary Constraint Checking Method

FIG. 1 is a flowchart for an exemplary method for checking constraints. As shown, the method 100 establishes constraints, re-establishes constraints, and removes constraints, in order to maintain variable update based constraint checking.

At 102, the method establishes constraint logic for maintaining a constraint during an identifiable program scope (e.g., global scope, object scope, procedure scope, method (within an object) scope, nested begin-end scope, etc.). For example, a constraint is identified in a source code listing via a constraint language construct (e.g., a boolean constraint given as the expression ($i \leq MaxInt$)). To establish the constraint, the method verifies that the constraint holds in the start state, and creates a data structure for maintaining active constraint meta-data. In one example, it rewrites the code of the update statements within the scope of the constraint wherever a variable upon which the constraint depends is updated, by injecting special calls to intercept the update statements. In another example, this rewriting has already taken place beforehand. To verify that the constraint holds in the start state, the method determines whether a constraint expression returns true (i.e., (i≦MaxInt)) evaluates to "true"). If desirable, when the evaluation of the expression yields "false", an exception is thrown indicating that the constraint has been violated. The exception can include information about the variables of the constraint, information about the constraint, and/or information about where in the programs the constraint was violated. The established constraint data structure contains meta-data and/or information relating constraints to the variables upon which a constraint depends. Finally, the establish method instruments the program such that any proposed update to a variable upon which a constraint depends, is directed to constraint checking logic as will be discussed (e.g., 104, 106). Then the program exits constraint establishment and begins executing.

At 104, a variable update function is encountered in the running program. The update function directs the proposed variable update and program flow to re-establish constraint logic 106.

At 106, the method re-establishes the constraint. First, the meta-data for the proposed update variable is examined to determine a constraint(s) that depends on the variable. Next, the meta-data for the determined constraint is examined to determine variables that the constraint depends on. Then the meta-data indicating the relationship between the constraint and the variables upon which the constraint depends is removed. The constraint expression is then evaluated in order to determine whether the constraint expression remains true with the proposed updated variable. If the proposed variable update would cause the constraint expression to evaluate to false, the variable is not updated and a constraint violation exception is thrown. If the constraint evaluates true with the proposed update, then the proposed variable update is carried out. Additionally, while the constraint expression is evaluated, all variables accessed (i.e., read) by the constraint are noted. The data structure is then updated to indicate an active relationship between the touched variables and the constraint. Finally, and optionally, the update statements in the program are altered such that only variables upon which the present state of a constraint depends are re-directed via update statements to constraint checking logic.

At 108, the method is dormant until either an update statement is encountered in the program code, or a constraint remove statement is encountered in the program code. If an update statement is encountered 108, 110, the method continues at 104, otherwise the method continues at 112.

At 112, the method removes the constraint logic from the instrumented program. In another example, remove statements are not placed into the augmented code. This would be true in cases where garbage collection or other means are used to clean up methods and data structures that no longer refer to variables that remain in an executing scope. In one such case, removing constraint logic is handled by the operating system or runtime.

Exemplary Constraint Monitoring System

Figure 2:
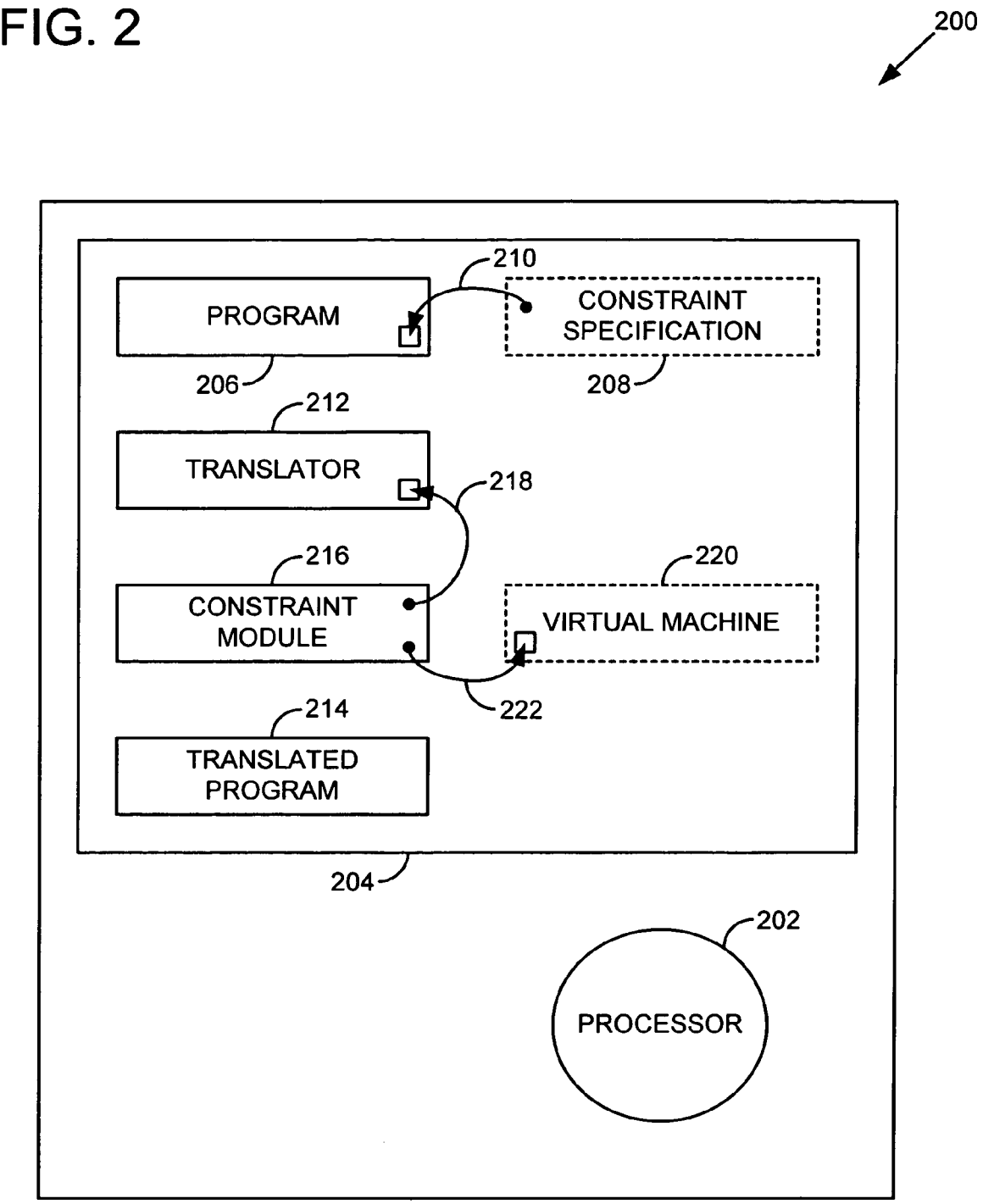
FIG. 2 is a block diagram of an exemplary system for constraint monitoring.

FIG. 2 is a block diagram of an exemplary system for constraint monitoring. The computer system 200 includes one or more processors 202 and a memory 204. The processor(s) execute programs which include instructions, data, and/or state. One or more programs execute modules that maintain constraints while an implementation executes. A module is a program, package, DLL, function, method, component, thread, or process that performs a described service. Modules can be grouped or separated in various ways so long as they perform a described service. Many times the order in which modules are performed can be altered without varying substantially from a described outcome.

It is often desirable to test or monitor program behavior. Constraints 208 are designed for a program 206. The constraints define relations on program state to be monitored. In one example, the constraints are defined in a separate constraint specification 208. In another example, the constraint(s) are defined in a source code listing of a program 210. A translator module 212 translates the program and/or constraints into a translated program 214.

A constraint module 216 establishes constraints (e.g., an establish constraint module), instruments variable updated instructions for variables upon which constraints depend (e.g., an instruction instrumentation module), verifies constraints when variables upon which a constraint depends are accessed (e.g., a constraint verification module), and maintains meta-data about constraint-variable relationships (e.g., a constraint-variable meta-data maintenance module). In one example, the constraint module is accessed by the translator 218 to inject constraint checking logic into a translated program 214. In another example, the constraint module is accessed 222 by a virtual machine 220 to maintain constraint logic in a run-time environment while executing the translated program 214. Other modules (not shown) access the constraint module during code injection (e.g., an injector tool) while injecting constraint logic into the translated program, or access the constraint module to instrument the program with constraints during debugging.

Exemplary Global Constraint

Figure 3:
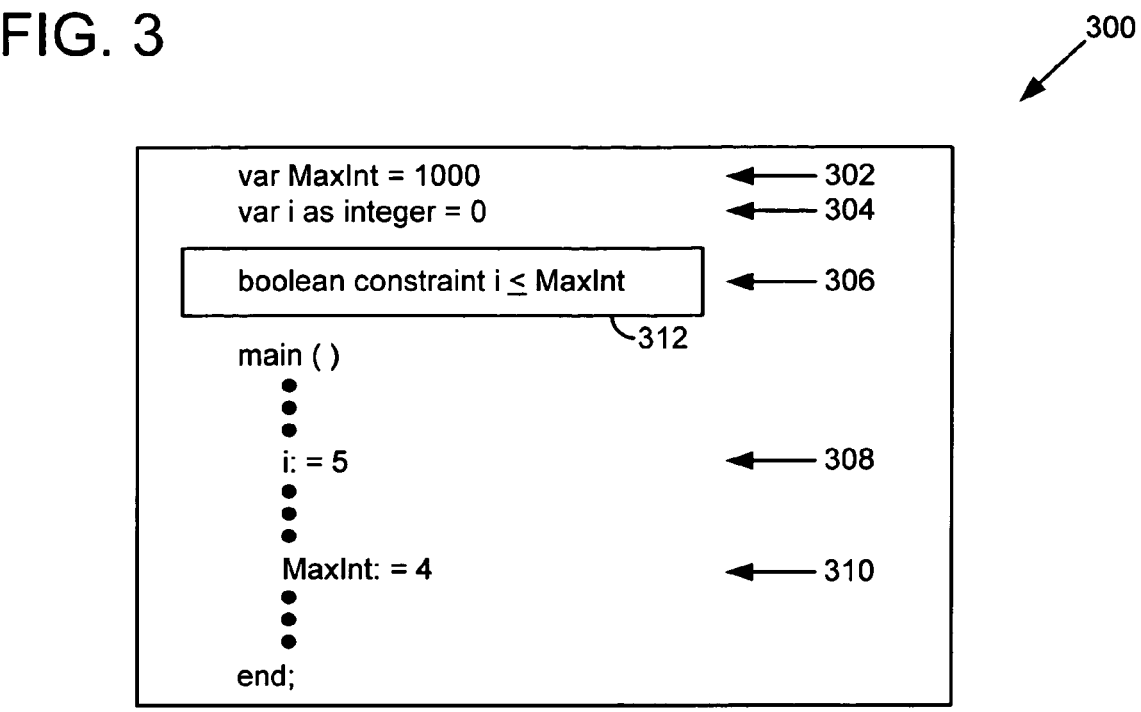
FIG. 3 is a program listing of an exemplary global constraint.

FIG. 3 is a program listing of an exemplary global constraint. In this example, the source code shown is pseudo code. However, as will be readily apparent to those of ordinary skill in the art, the described technologies would not be limited to any specific language or programming paradigm.

As shown, the source code 300 includes two variables called MaxInt 302 and i 304. Additionally, a language construct (i.e., a token) called "constraint" 306 is introduced which signals to a compiler that the expression following the constraint should hold throughout an express or implied scope. In this example, since constraint is defined in the source code at the global level, it is implied that the expression should hold throughout the entire program's scope. In another example, if a constraint is defined within some other nested scope, it is implied that the constraint holds for such a scope. For example, a constraint defined in a procedure or object would imply maintaining the constraint while the procedure is executed or during the object's lifetime. Of course, a constraint may also be implied for a method scope as defined within a method within an object.

In this example, a constraint depends on two variables 306 (i.e., i and MaxInt). As shown, any time a variable upon which a constraint depends is updated 308, 310, a potential exists that an update could violate the constraint. Additionally, a constraint may also be violated when it is established 306, when the start state of the variables upon which the constraint depends are in violation. A constraint is violated if a proposed variable update would cause an expression defined within the constraint to evaluate to a value indicating false.

Figure 4:
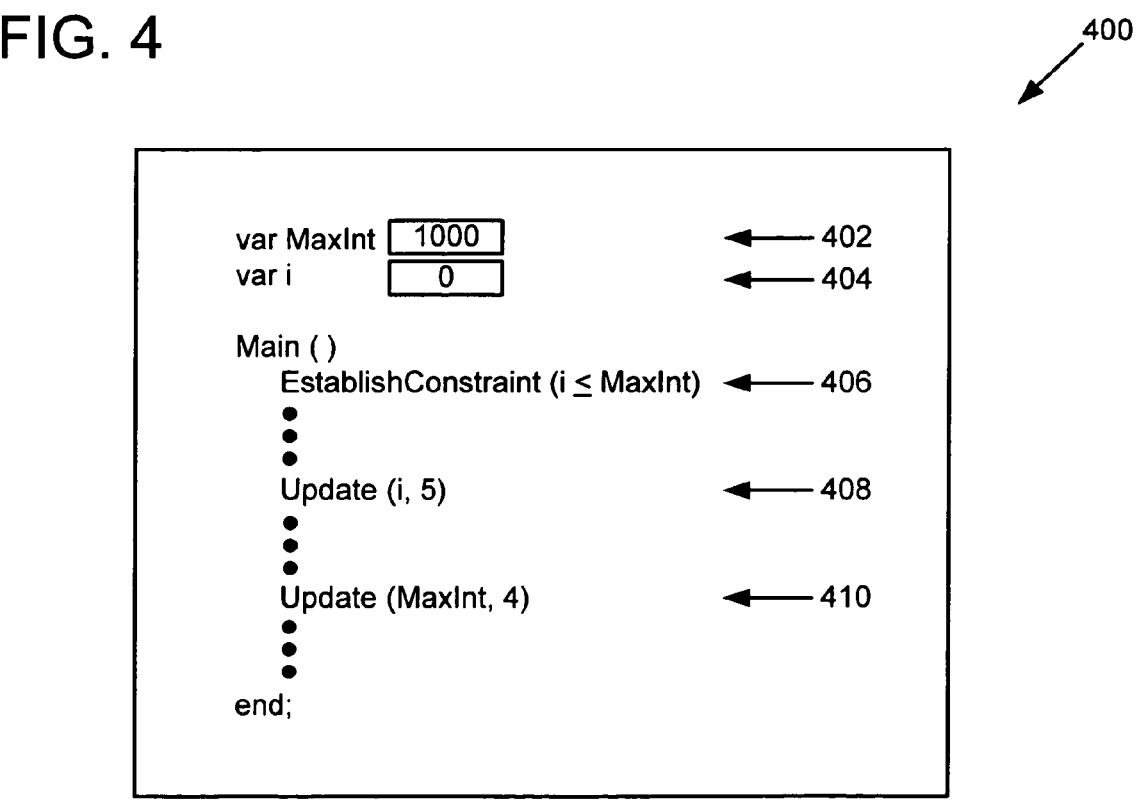
FIG. 4 is a pseudo code representation of an exemplary translated program listing of FIG. 3.

FIG. 4 is a pseudo code representation of an exemplary translated program listing of FIG. 3. For example, source code is translated (e.g., compiled, interpreted, etc.) into a lower level language representation that can be run directly by the processor or in conjunction with a virtual machine (e.g., Microsoft .NET, Java, etc.). The actual code that a translator would produce would vary substantially based on the processor and/or virtual machine and/or other factors and is not necessary or helpful in understanding the described technologies. Thus, the provided translated code 400 focuses instead on examples of where the described technologies inject statements into pseudo-code to provide relevant variable based constraint monitoring.

In one example, early in the programs code, a translator and/or constraint module determines that the constraint is global in scope and injects an establish constraint method in the code. The establish constraint procedure 406 marks the two variables 402, 404 as variables upon which the defined constraint depends. The values that the variables contain is shown in boxes, which symbolize that variables are a container whose value can change over time. The initial values are "1000" and "0" respectively. Additionally, the establish constraint, determines whether the constraint is true for the start state of the variables. Next, the translator injects update methods 408, 410 in the code anywhere that a (potentially) constraint dependent variable is changed. The update method 408 checks whether a proposed variable update 308 would result in an inconsistent state.

FIG. 5 is a program listing of an exemplary method that determines whether a constraint holds. In the example, an update method 500 determines whether the constraint holds for an arbitrary variable 502, 504 upon which the constraint depends. If the constraint is violated 506 by a proposed update an exception is thrown, otherwise the proposed update is allowed 508. Importantly, notice that in this example the programmer introduces a constraint 306 in the source code, and the described technologies determine where variables that might violate the constraint are located, and inserts/injects constraint checking where relevant. In this way, a programmer can define constraints for a given scope and a constraint translator component will maintain the constraint throughout the desired scope without requiring a programmer to decide where in the source code a particular constraint condition should be inserted. In this example, a particular update method specialized for the given constraint was shown. In general, a single update method could be used for all constraints of a system. This single update method would use the meta-data information of the constraints to carry out its task.

Exemplary Dynamic Constraints

FIG. 6 is a program listing of a constraint that changes during program execution. The described technologies will support constraints via many environments such as in a compiler (e.g., translator) component, a run-time component, a debugger tool, and injection tool, and/or a virtual machine environment. In general, a virtual machine environment provides an efficient environment especially for dynamic constraints. However, a translator component also provides dynamic constraint support, whether global or otherwise.

In one example, a program listing 600 includes a Boolean variable "active" 602 which is initialized as false, so a constraint 604 returns true, without evaluating the other branch of the if statement (i.e., (i≦MaxInt)). Thus, until the active variable is set to "true" 608, part of the constraint expression will not be accessed (i.e., (i≦MaxInt)). Since constraints can be dynamic in nature, it would be helpful to reduce the weight placed on a program until a given constraint branch or expression becomes relevant.

Figure 7:
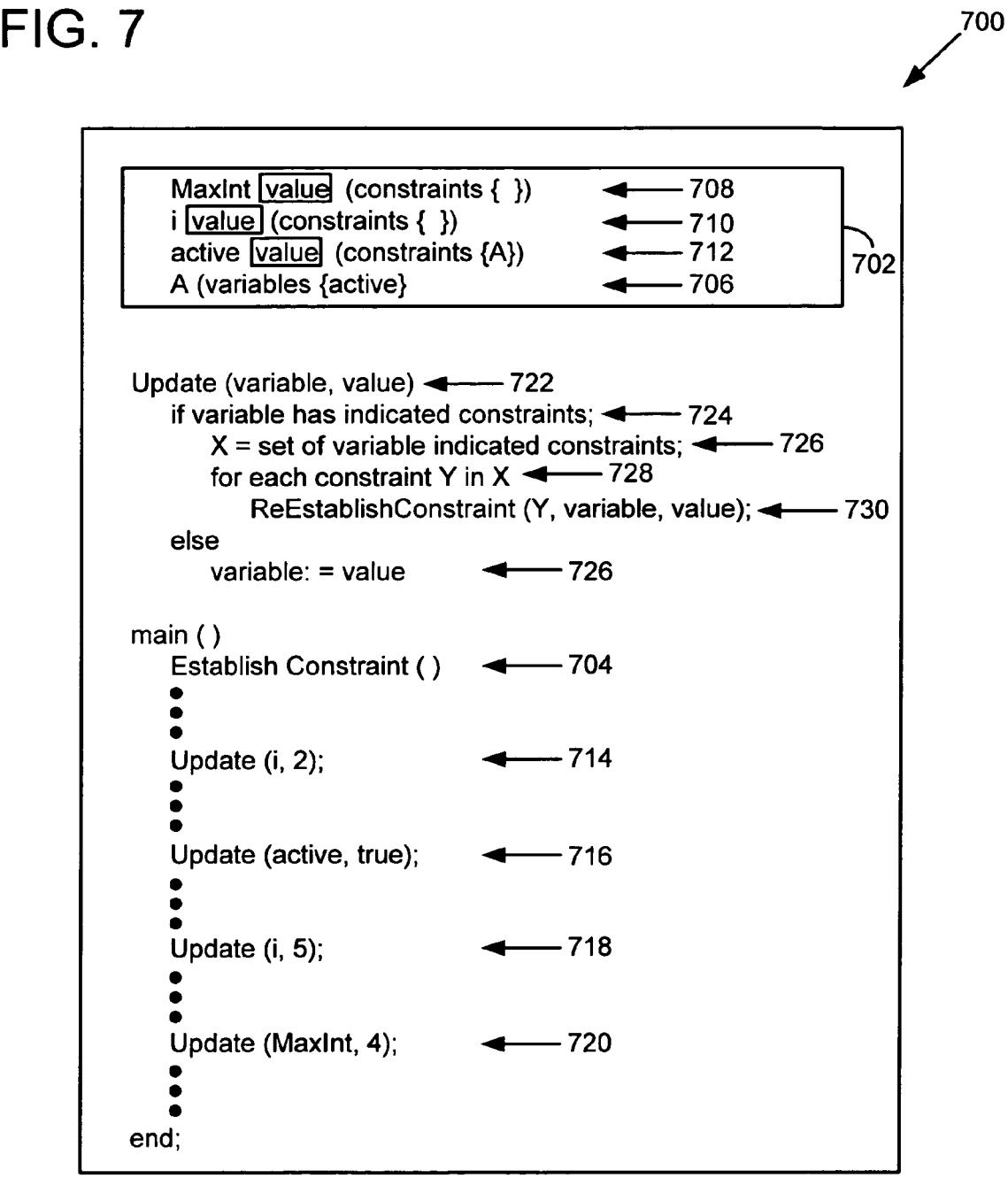
FIG. 7 is a pseudo-code representation of an exemplary translated program listing of FIG. 6.

FIG. 7 is a pseudo-code representation of an exemplary translated program listing of FIG. 6. In this example, constraint A ( ) 604 pseudo-code includes a dynamic variable-constraint relationship 702. As shown, a translator component (or constraint module) creates code that maintains the dynamic constraint conditions. An establish constraint method 704 determines all variables that might be accessed while evaluating any of plural constraints. As shown, the establish method identifies a constraint 604, and creates metadata indicating the constraints identifier 706, and possible variables that could be accessed by the constraint through various branches of the constraint 708-712. Since active is initialized as false 602, the metadata indicates that constraint "A ( )" accesses only variable "active" 706, and no other, and therefore initially depends on the variable "active" only. Optionally, variable "active" 712 can include metadata indicating the constraints depending thereon. Next, the establish method introduces code into the program that calls an update function for each variable that may be accessed in the determined constraints metadata 708-712. Thus, an update function is introduced at each possible relevant variable update as shown 714-720. Upon exiting the establish method 704, the program executes as usual until reaching the first update statement 714. Then update (i, 2) is called 722, and since variable "i" 710 has no active constraints 724, the variable is updated accordingly 726 and no constraints need to be checked. However, when the active variable update is encountered 716, the meta-data indicates constraint "A" for the active variable 712. Since A is indicated 724, X is set equal to a set of constraints indicated for the active variable 726 (i.e., X={A}). Then for each constraint in X 728, a re-establish constraint method is called 730 with the constraint as input along with variable and value input parameters.

The re-establish constraint method 730, determines which variables are active for the input variable (e.g., "active" in this case) and removes the metadata 712, 706 indicating constraint-variable associations. In this example, "A" is removed from the active constraints 712 and "active" is removed from the constraint A variables 706. Next, re-establish evaluates the constraint with the proposed update values (i.e., variable as active, value as true) 716. With a temp active variable set at true, the constraint 704 604 now evaluates another branch of the constraint (i.e., (i≦MaxInt)). Since the new evaluation of constraint is true (i.e., ((i=0)≦(MaxInt=1000)), the actual "active" variable is updated since the constraint A ( ) returns true.

Additionally, since the constraint A ( ) evaluation accessed "active", "i", and "MaxInt", the meta-data 702 is updated to indicate that A depends on the three variables, and that each variable is associated with constraint A.

Figure 8:
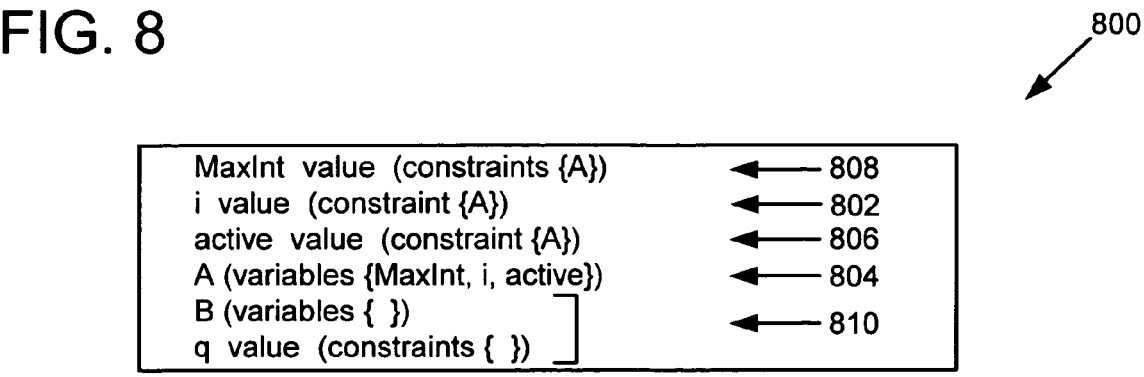
FIG. 8 is a data structure indicating exemplary constraint-variable dependency relations.

FIG. 8 is a data structure indicating an exemplary constraint-variable dependency relations. As shown, a data structure 800 indicates that constraint A depends on variables MaxInt, i, and active 804. Additionally, MaxInt, i, and active indicate a constraint(s) that depends on them 808, 802, 806. In other examples, depending on constraint scopes, branches through active constraints and related variables, the data structure may have many other constraint variable relations (i.e., 810). However, in this example, since active is now set true and all relevant relations have been dynamically reset based on variables read in the constraint re-establishment, the update (active, true) method call is complete 716.

Next, the program executes until the next update (i, 5) call 718. In this case, since variable i has constraint A indicated

802, X is set equal to {A} 726. Next, re-establish is called on "A" 728, 730 (i.e., ReEstablishConstraint (A, i, 5)). Again, the variables indicated in the metadata for A are cleared, and those variables indicated in A 804 (i.e., {MaxInt, i, active}) are used to find where to remove A from associated variables 802, 806, 808. Constraint A is checked again with a temp value for i, and if constraint A returns true with the temp for i, then i is updated (i.e., i:=5) with the input parameter value 718. Again, since constraint A ( ) returns true, the data structure is populated with the touched constraint-variable relations. Notice that in this case, only constraint A is indicated for variable i 802. However, in other examples, plural constraints may depend on any arbitrary variable i and the constraints would be re-established for each such constraint in the set 728.

Finally, when execution reaches update (MaxInt, 4) 720, and when re-establish is called (i.e., ReEstablishConstraint (A, MaxInt, 4)) 730, the constraint (i.e., ((i=5)≦(temp:=4) returns false so an exception is thrown, and MaxInt is never assigned the inconsistent data value of 4. Of course, the exception throwing logic may exist in the re-establish method 730 or in update 722, or elsewhere in the control flow. For example, a try-catch statement could be inserted surrounding the re-establish constraint call 730, the update call 720, or elsewhere as will be appreciated by those of ordinary skill in the art.

In this example, a constraint is shown to be dynamic in nature based on variable changes 716, and a control flow through several paths through a program (not shown) or based on several paths through a constraint expression 604. Additionally, constraints did not require evaluation of variables upon which a constraint depends until such time that a variable has an indicated constraint 724. Finally, variables are shown to indicate constraints through some execution paths but not others (e.g., 714 versus 718).

Exemplary Constraint Translators

Figure 9:
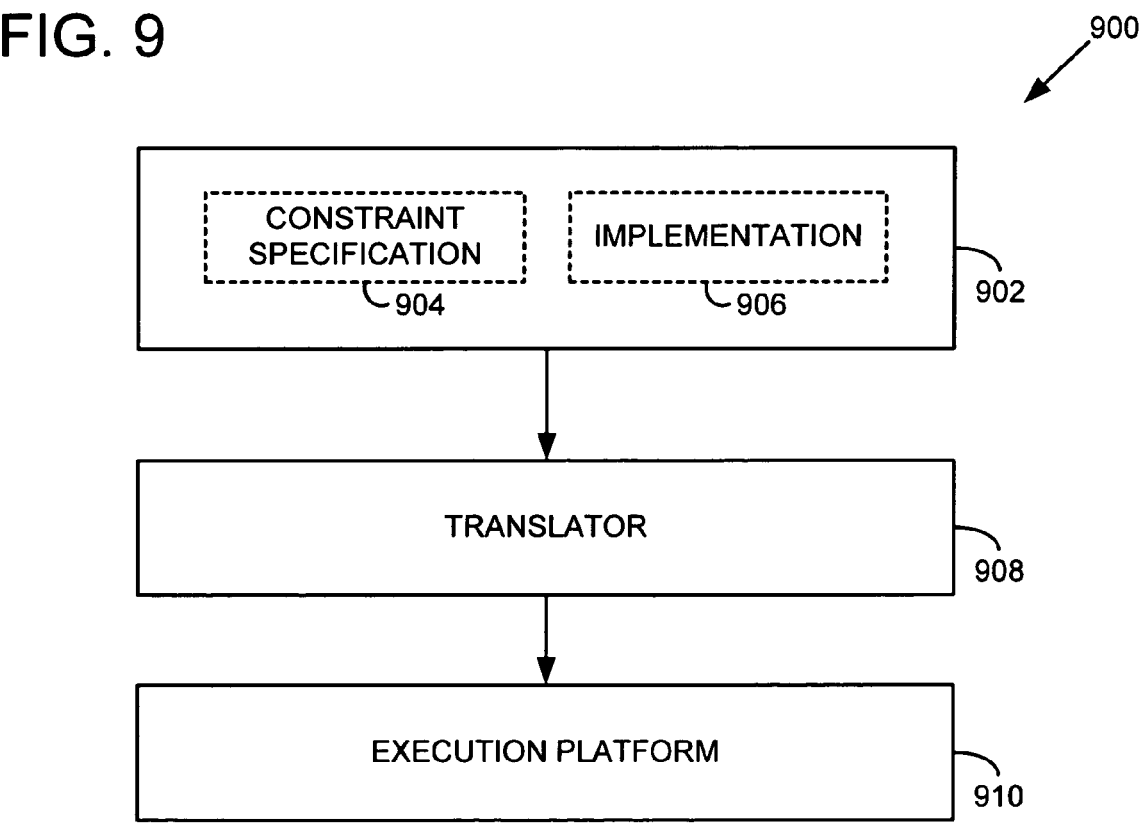
FIG. 9 is an exemplary method for creating and maintaining constraints for an execution environment.

FIG. 9 is an exemplary method for creating and maintaining constraints for an execution environment.

At 902, a source code listing such as that shown in FIG. 3 or 6 is created by a programmer. In the previous examples, the source code listing and constraints were shown as a single document 300, 600. However, in another example, a constraint specification 904 is created separate from the implementation 906. For example, constraint information 312 would appear in the constraint specification 904, while all other listing statements except the constraint information would be in the implementation 906. In another example, constraint information 610 is listed in the constraint specification, while the balance of the program listing 600 would appear in the implementation listing 906.

At 908, a translator component (e.g., compiler, interpreter, intermediate language compiler, etc.) translates the implementation and constraints into a lower-level language (e.g., machine code, binary code, byte code, intermediate level code, etc.) suited for a specific execution platform. In one example, the translator is a C# compiler, and the lower-level language is an intermediate language suitable for running on a virtual machine (e.g., .Net from Microsoft Corporation). In another example, the translator is a C++ compiler, and the lower-level language is machine code executable by a processor.

At 910, the translated code is run on the intended execution platform. For example, if the implementation and associated constraints are translated into machine code, the resulting code and data structures perform constraint monitoring, dynamic or otherwise, as discussed with respect to FIG. 1-6.

In an example where the implementation and/or constraints is translated into an intermediate level representation, certain efficiencies are provided post-translation by an execution platform. In one such example, dynamic data structures (e.g., 702) are created and maintained by the runtime as a virtual machine translates an intermediate language representation into native instructions, and the runtime dynamically alters the dynamic data structure as constraint-variable relations evolve during processing. In one example, a call to an update method existed in the listing (e.g., 714) even though a variable did not indicate an active constraint. In one example, a dynamic runtime environment would inject the update statement into execution flow only when an active constraint depended on the variable. In another variation of efficiency, the runtime would maintain a data structure of active constraint-variable relations, and re-assert constraints when a relevant variable update is encountered.

Exemplary Constraint Execution Platform

Figure 10:
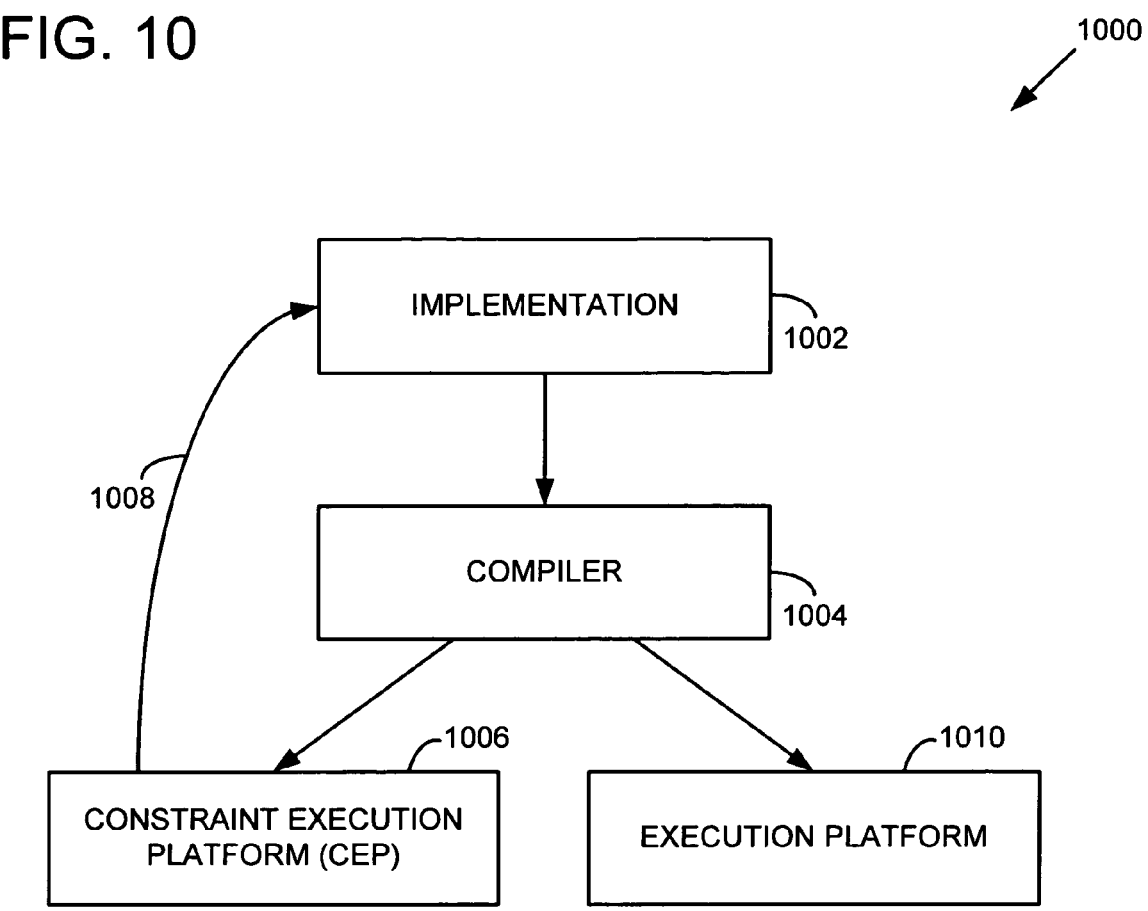
FIG. 10 is an exemplary method for creating and maintaining constraints in a constraint execution environment.

FIG. 10 is an exemplary method for creating and maintaining constraints in a constraint execution environment.

At 1002, a programmer creates source code which includes a constraint construct in source code or a separate constraint specification. The source code and/or constraint specification is input to a source code compiler.

At 1004, the compiler receives the source code with a constraint (e.g., 312, 610) or in a separate constraint specification. In this example, the logic for establishing, re-establishing and maintaining constraints does not exist in the compiler. Thus, the compiler merely identifies the defined constraint constructs (e.g., 312, 610) and passes them through in translated or identifiable tokens expected by a constraint execution platform.

At 1006, a constraint execution platform (CEP) identifies the constraint constructs and expressions and creates dynamic constraint-variable data structures (e.g., 800). Additionally, as constraint dependent active variables are encountered in the translated code, the CEP re-establishes the constraints in order to identify variables that are presently relied upon by evolving active constraint expressions. The CEP then maintains in the runtime, an indication of active variables so when they are encountered, dependent constraints are again re-established. In one example, the runtime alters the executing native code to call an update function that re-establishes constraints in order to determine evolving constraint dependent variables.

Optionally, in cases where a CEP platform is used for testing or development, and after a constraint violation has identified a program error 1008, the implementation is altered 1002 and compiled again 1004.

At 1010, a compiled implementation is run on an execution environment that ignores the constraint constructs. Optionally, the implementation has the constraint constructs (e.g., 312, 610) removed from the source code, or the implementation is compiled without the constraints specification. At 1010, the normal execution environment runs without constraints or runs with the constraints, but does not include the requisite logic to support the constraints.

In one example, the CEP is used in the software development environment, and the other execution platform 1010 is running on a software purchaser's computer.

In general, it is expensive to create dynamic data structures for any or many arbitrary constraint expressions and instrument the resulting code with update functions and constraint re-establishment functions in the compilation environment. Thus, it is more efficient to run that constraint checking logic in a runtime environment or runtime platform. Thus, the runtime can start with variables without the meta-data information. When a constraint is first established for a scope (e.g., global, procedural, object, nested begin-end, etc.), a constraint-variable relationship meta-data is maintained only for active constraint-variables. However, when an active variable is encountered, a constraint update add/removes constraint-variable relationships based on variables touched in various branches of a constraint expression (e.g., if-then-else, case statements, etc.). These touched variables become part of active constraint-variable relations and the code is updated to re-establish related constraints when these variables are touched in the updated code.

Exemplary Constraint Injector Tool

Figure 11:
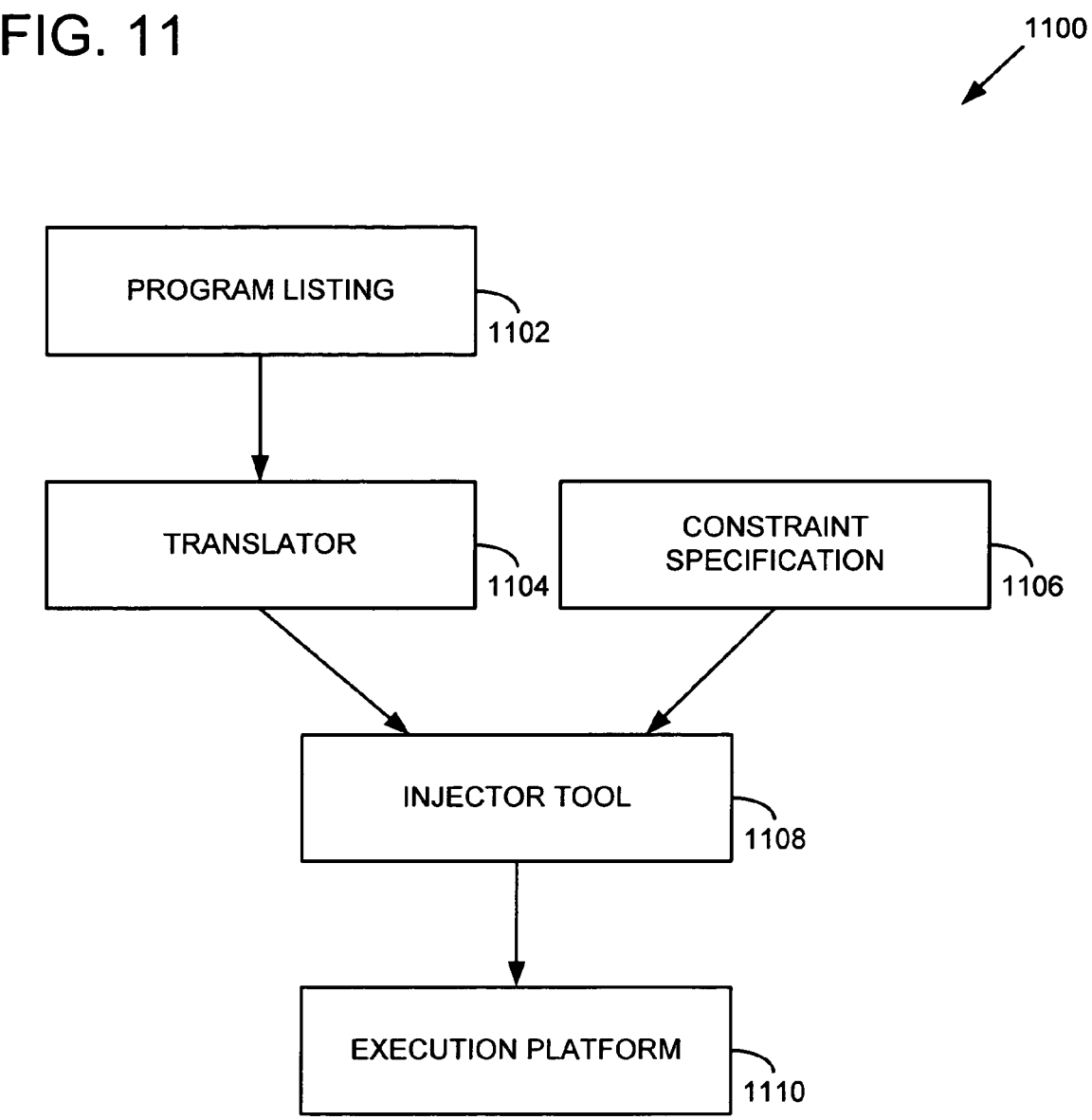
FIG. 11 is a flowchart of an exemplary method for managing constraints using an injector tool.

FIG. 11 is a flowchart of an exemplary method for managing constraints using an injector tool. In one example, source code 1102 was previously compiled 1104 and a constraint specification 1106 defines constraints that monitor the compiled implementation. In another example, a constraint specification is created by the implementation developer in view of required program specifications. In any such example, a constraint specification is created in view of required program specifications. In any such example, an injector tool instruments the compiled implementation with the described constraint checking technologies.

At 1102, a software developer creates a program listing.

At 1104, a translator receives the program listing as input and translates the program into a lower level (e.g., machine code, intermediate code, etc.).

At 1106, a constraint specification is created in view of testing/monitoring the behavior of a specific translated program listing (e.g., the output of step 1104).

At 1108, an injector tool receives a translated program and a constraint specification as input, and injects constraint monitoring logic into the translated program according to the constraint specification.

At 1110, an execution platform runs the translated program according to constraints injected by the injection tool.

In one example, a program listing is maintained in a separate document than a constraint specification (e.g., 904, 1106, etc.). This would be a benefit, for example, where a program proves efficient based on information determined during iterative or version program development or trail and error, and/or as determined by constraint monitoring. In such a case, a developer may decide to ship a resulting program without instrumented constraints. This may provide additional commercial advantage in the form of withholding valuable meta-data information from competitors that might otherwise be determined by reverse compilation or reverse engineering.

Finally, if an injector tool also includes debugger technology or debugger includes injector or instrumentation technology, a program tester could load the translated program listing 1104 into the debugger-injector-tool 1108, and test the program listing according to the constraint specification and/or debugger features. Additionally, in another example, an injector-debugger-tool provides a GUI to create, alter, and monitor constraints in real time in a debugging environment.

Exemplary Constraint-Variable Relations

Figure 12:
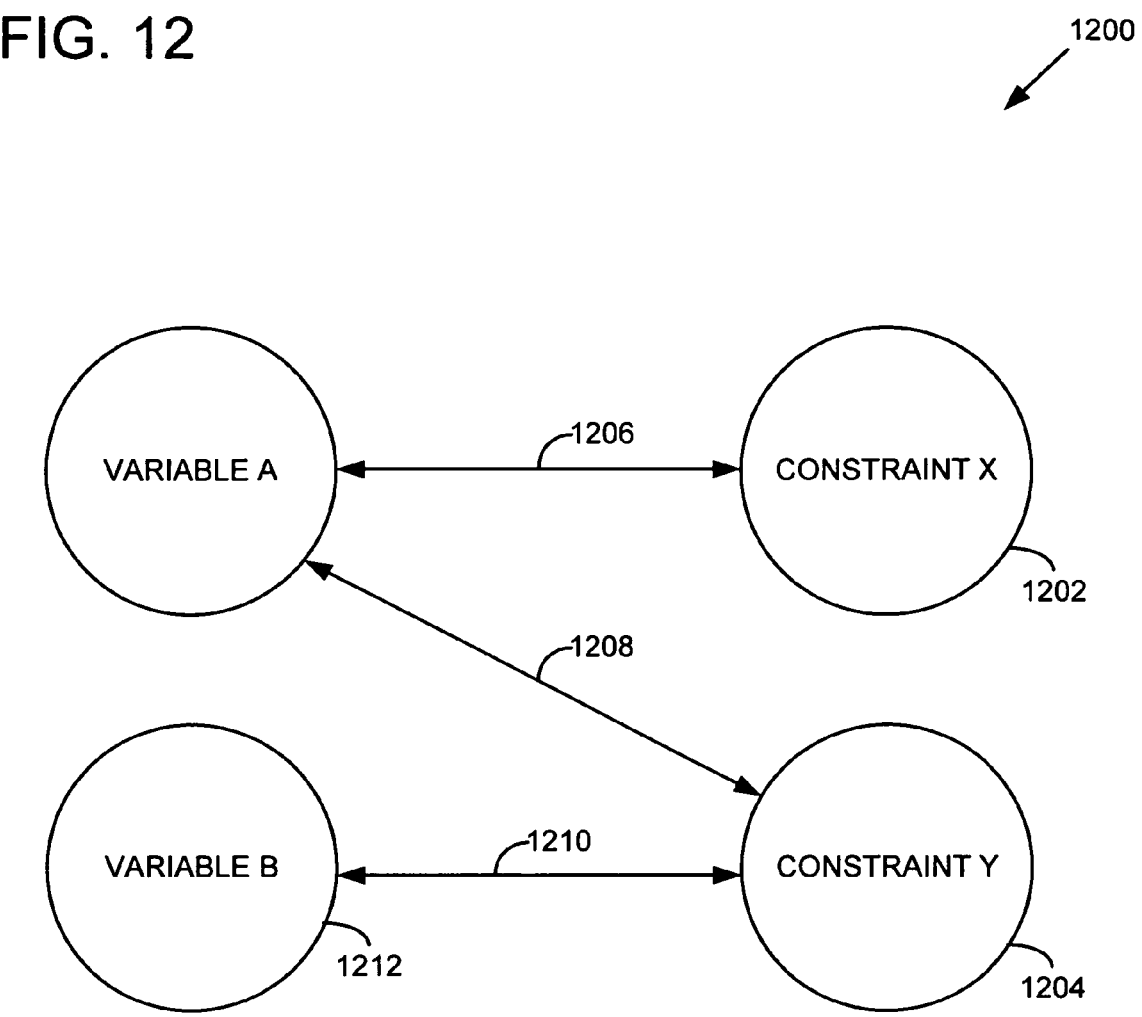
FIG. 12 is a diagram representing dynamic evolving constraint-variable relations.

FIG. 12 is a diagram representing dynamic evolving constraint-variable relations. In this example, for a given scope, an establish constraint method has determined for two constraints 1202, 1204, the present constraint-variable relations 1206, 1208, 1210. Thus, meta-data associated with variable A will indicate 1206, 1208 dependent constraints X and Y 1202, 1204. Additionally, metadata for variable B indicates 1210 a dependent constraint Y 1204.

In order to support these constraint-relations 1206-1210, proposed program updates to variable A or B are instrumented with logic to remove and replace existing dependent-constraint relations. For example, an instruction that updates variable A is instrumented to verify that the new value for A will maintain the dependent constraints X and Y. If constraints X and Y remain true with the new variable A value as input to the constraint expressions, then A is updated with the new value, and variables touched in evaluating constraint X and Y are recorded as new constraint-variable relations. Additionally, instructions that touch the variables touched evaluating the constraints are instrumented with logic to remove and replace existing dependent constraint relations for future variable update attempts.

In another example, when an update to variable B 1212 is proposed, constraint checking logic determines whether the proposed new value for variable B will hold for constraint expression Y 1204. If so, B is updated with the proposed value and all variables touched in evaluating constraint Y are indicated as constraint-variable relations on constraint Y. Additionally, instructions updating the touched variables upon which Y depends are instrumented to remove and replace constraint Y.

Exemplary Constraint Class Score

Figure 13:
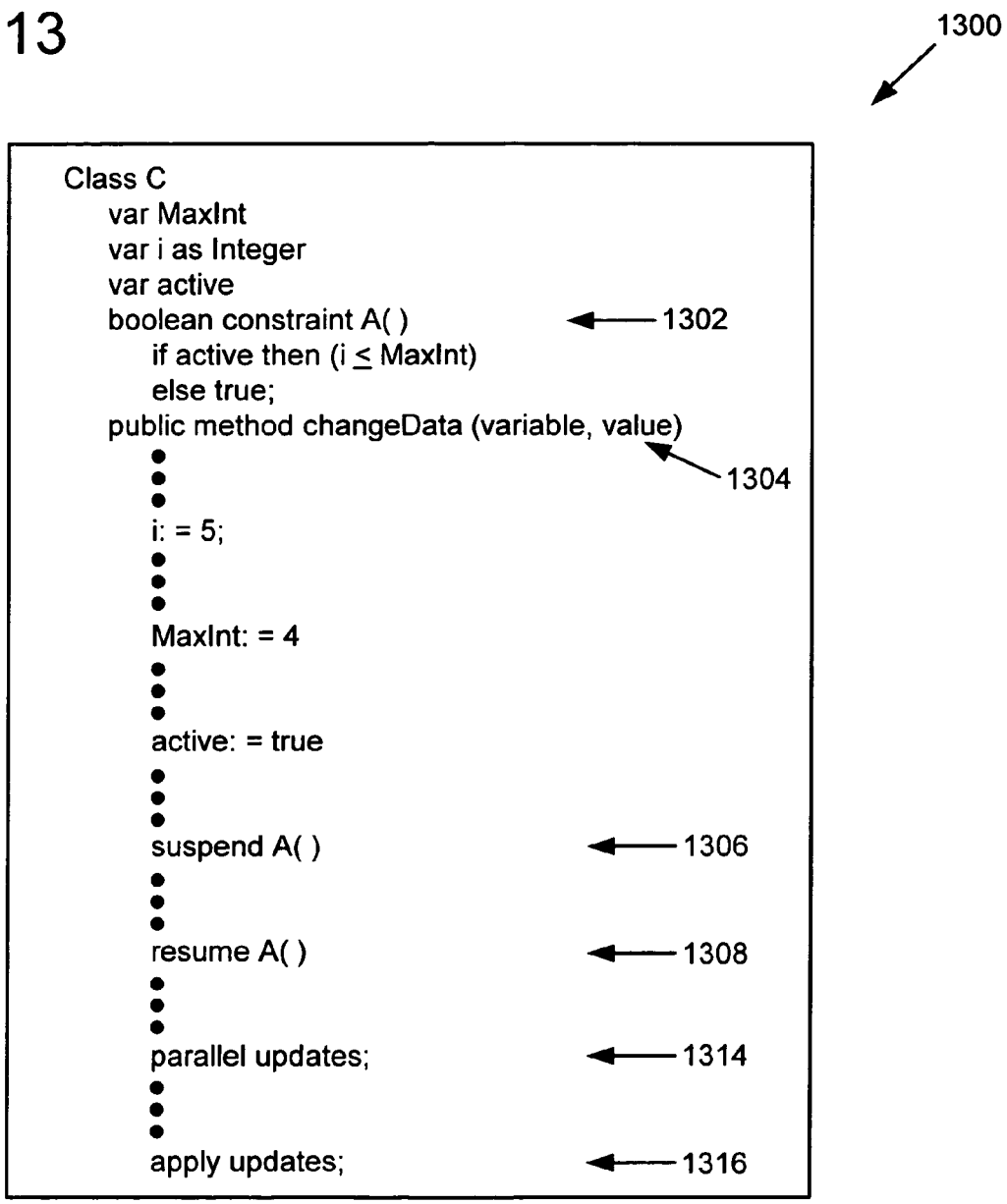
FIG. 13 is a program listing of an exemplary class containing a defined constraint.

FIG. 13 is a program listing of an exemplary class containing a defined constraint. In this example, the program listing 1300 is a class definition with a constraint 1302 and a public method 1304. In another example, the method may be an internal or private method.

In one example, it is desirable to temporarily suspend constraint checking 1306. For example, a programmer may know that it is acceptable to suspend a constraint for a period in order to perform a series of steps that may violate a constraint. After the steps are complete, the programmer resumes the constraint 1308. In such an example, tokens are provided (e.g., suspend and resume) for signaling the constraint suppression to the compiler or runtime. When a resume token is called, the constraint is re-established and an exception is generated if the resumed constraint is violated. In such an example, while the constraint is suspended, information is attached to each relevant variable upon which the constraint depends indicating that the constraint not be checked. Upon exiting such a scope 1308, the information indicating not to check the constraint is removed, and the constraint is re-established.

In another example, it is desirable to perform several variable updates in parallel 1314, and return all such variables to their previous state if a (any) constraint is violated. In one such example, old values are stored and restored if the parallel update fails. In another example, the real variables remain unchanged during parallel updates and temporary variables are changed and used to verify constraints. When parallel updates hold for any associated constraint, the temporary variable values are applied to the real variables. In such an example, tokens are provided (e.g., parallel updates 1314 and apply updates 1316) for signaling parallel updates to a compiler or runtime.

Exemplary Class Meta-data

Figure 14:
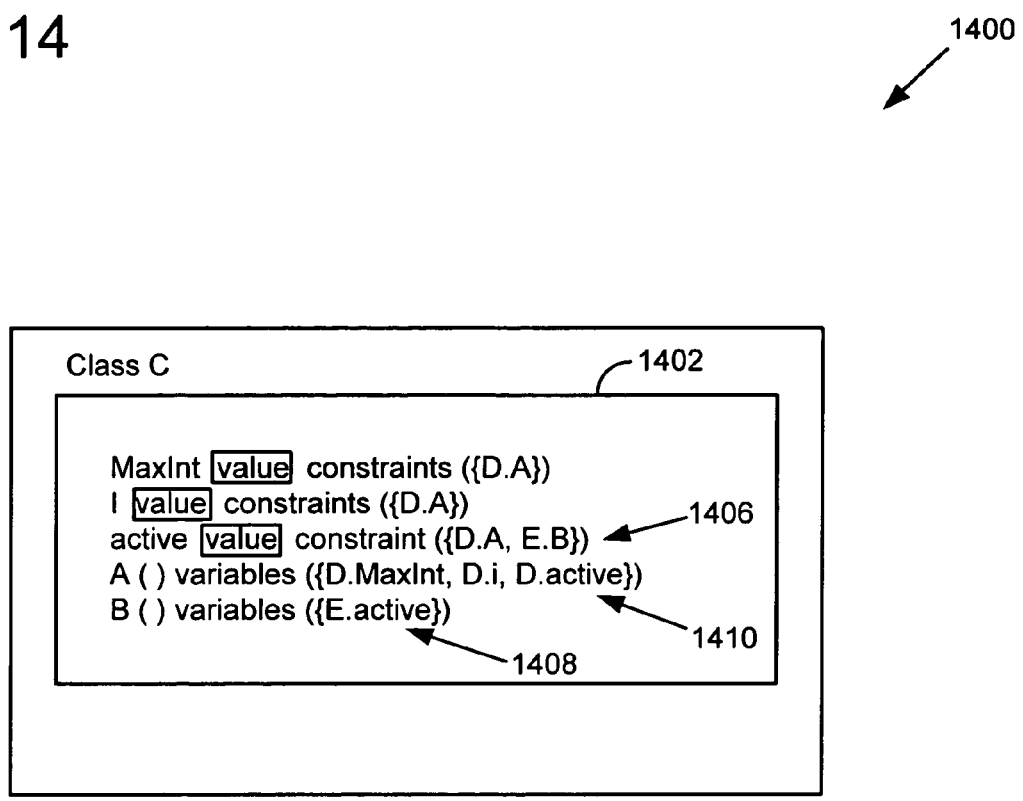
FIG. 14 is a pseudo-code representation of meta-data of a translated class structure.

FIG. 14 is a pseudo-code representation of meta-data of a translated class structure. In this example, a translated program listing includes a meta-data 1402 for indicating that a class variable may have several instantiations. For example, an "active" variable indicates that it is an active variable for a constraint "A" in a class instantiation called D 1404 and it is an active variable for a constraint "B" in a class instantiation called E 1406. When a constraint is removed and reasserted (e.g., re-established), the meta-data is searched to find variables that indicate the constraint so they can be removed. However, and optionally for efficiency, constraint meta-data is added to the data 1402 indicating the variables upon which constraints depend 1408, 1410. This is helpful since a constraint indicator is accessed to determine which variables to remove data indications from when removing constraints. Additionally, if update statements changing program flow are dynamically removed from or added to the translated program, this information indicates which variable updates are relevant.

Computing Environment

Figure 15:
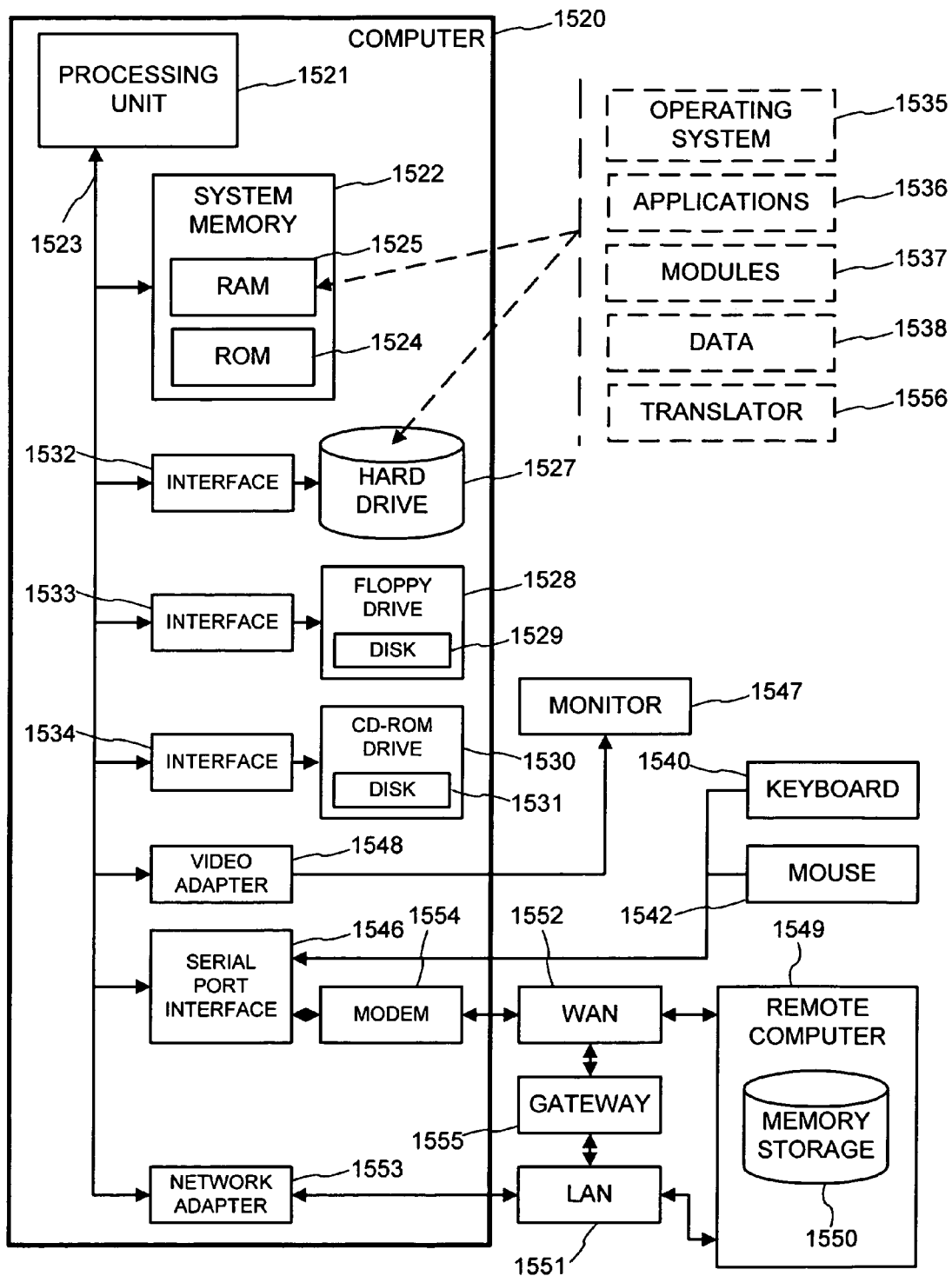
FIG. 15 is a block diagram of a distributed computer system implementing the described technologies.

FIG. 15 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that perform particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 15, an exemplary system for implementation includes a conventional computer 1520 (such as personal computers, laptops, servers, mainframes, and other variety computers) includes a processing unit 1521, a system memory 1522, and a system bus 1523 that couples various system components including the system memory to the processing unit 1521. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 1521.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 1524 and random access memory (RAM) 1525. A basic input/output system (BIOS), containing the basic routines that help to transfer information between elements within the computer 1520, such as during start-up, is stored in ROM 1524.

The computer 1520 further includes a hard disk drive 1527, a magnetic disk drive 1528, e.g., to read from or write to a removable disk 1529, and an optical disk drive 1530, e.g., for reading a CD-ROM disk 1531 or to read from or write to other optical media. The hard disk drive 1527, magnetic disk drive 1528, and optical disk drive 1530 are connected to the system bus 1523 by a hard disk drive interface 1532, a magnetic disk drive interface 1533, and an optical drive interface 1534, respectively. The drives and their associated computer-readable media provide nonvolatile storage of data, data structures, computer-executable instructions, etc. for the computer 1520. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 1525, including an operating system 1535, one or more application programs 1536, other program modules 1537, and program data 1538; in addition to an implementation 1556.

A user may enter commands and information into the computer 1520 through a keyboard 1540 and pointing device, such as a mouse 1542. These and other input devices are often connected to the processing unit 1521 through a serial port interface 1546 that is coupled to the system bus, but may be connected by other interfaces, such as a parallel port, game port or a universal serial bus (USB). A monitor 1547 or other type of display device is also connected to the system bus 1523 via an interface, such as a video adapter 1548. In addition to the monitor, computers typically include other peripheral output devices (not shown), such as speakers and printers.

The computer 1520 operates in a networked environment using logical connections to one or more remote computers, such as a remote computer 1549. The remote computer 1549 may be a server, a router, a peer device or other common network node, and typically includes many or all of the elements described relative to the computer 1520, although only a memory storage device 1550 has been illustrated. The logical connections depicted include a local area network (LAN) 1551 and a wide area network (WAN) 1552. Such networking environments are commonplace in offices, enterprise-wide computer networks, intranets and the Internet.

When used in a LAN networking environment, the computer 1520 is connected to the local network 1551 through a network interface or adapter 1553. When used in a WAN networking environment, the computer 1520 typically includes a modem 1554 or other means for establishing communications (e.g., via the LAN 1551 and a gateway or proxy server 1555) over the wide area network 1552, such as the Internet. The modem 1554, which may be internal or external, is connected to the system bus 1523 via the serial port interface 1546. In a networked environment, program modules depicted relative to the computer 1520, or portions thereof, may be stored in the remote memory storage device. It will be appreciated that the network connections shown are exemplary and other means of establishing a communications link between the computing devices may be used, wireless or otherwise.

Alternatives

Having described and illustrated the principles of our invention with reference to illustrated examples, it will be recognized that the examples can be modified in arrangement and detail without departing from such principles. Additionally, as will be apparent to ordinary computer scientists, portions of the examples or complete examples can be combined with other portions of other examples in whole or in part. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which the principles of our invention may be applied, it should be recognized that the details are illustrative only and should not be taken as limiting the scope of our invention. Rather, we claim as our invention all such embodiments as may come within the scope and spirit of the following claims and equivalents thereto.

We claim:

1. A computerized method of state dependent constraint checking, the method comprising:
   receiving a program listing and a representation of a constraint;
   creating control logic comprising:
      determining when updates are proposed for an updated variable in the program listing upon which a constraint expression for the constraint depends;
      determining whether the constraint would be violated if the updated variable is updated with a proposed value;
      removing data indicating a relationship between the constraint and a set of variables upon which the constraint depends before the constraint is modified by updating the updated variable;
      determining one or more accessed variables which are accessed during evaluation of the constraint expression, wherein the evaluation is performed on the constraint expression as modified by the updated variable being updated to the proposed value; and
      creating data indicating relationships between the constraint and the one or more accessed variables, wherein the set of variables upon which the constraint depends changes through re-establishing the constraint such that the set of variables includes the one or more accessed variables; and
   verifying the constraint by executing a translated version of the program listing which comprises at least in part the control logic.

2. The method of claim 1, wherein the constraint expression is an expression in one of plural branches of a branched constraint expression for the constraint.

3. The method of claim 1, wherein the program listing is source code and a constraint is received in a constraint specification.

4. The method of claim 1, performed by an injector tool that instruments the program listing with said control logic.

5. The method of claim 1, performed by a virtual machine that maintains the created control logic in a run-time environment.

6. The method of claim 1, wherein determining when updates are proposed for variables upon which a constraint expression depends comprises injecting an update function call at program listing instructions that update variables upon which a constraint expression depends.

7. A computer system comprising:
   memory and a central processing unit executing a translator for translating a program; and
   constraint modules for checking defined constraints and comprising:
      an establish constraint module,
      an instruction instrumentation module for instrumenting variables in the program upon which constraints depend,
      a constraint verification module for verifying constraints with a proposed variable value, and
      a constraint-variable meta-data maintenance module, which maintains constraint-variable dependence relations for plural constraints by, when an update is proposed for updating a variable accessed by a constraint with a proposed value:
         removing meta-data showing relationships between the constraint and a first set of variables accessed by the constraint before the constraint is modified by the update; and
         creating meta-data showing relationships between the constraint and a second set of variables accessed by the constraint after the constraint is modified by updating the variable to the proposed value, wherein variables that are accessed by the constraint are changed from the first set of variables to the second set of variables through re-establishing the constraint.

8. The computer system of claim 7, wherein the constraint modules for checking defined constraints are modules accessed by a virtual machine.

9. The computer system of claim 7, wherein the constraint modules are accessed by a translator to inject constraint checking logic into a translated program.

10. The computer system of claim 9 wherein the translated program is machine code executable by the central processing unit.

11. The compute system of claim 7, wherein the translator translates the program into intermediate level code.

12. The computer system of claim 11 wherein said intermediate level code runs in a virtual machine and said constraint modules comprise logic accessed and run by the virtual machine.

13. The computer system of claim 12 wherein the instruction instrumentation module dynamically instruments variables upon which a constraint depends based on variables accessed in a constraint expression by the constraint verification module when it verifies a constraint with a proposed variable value.

14. The computer system of claim 7, wherein a scope of defined constraints is at least one of a global constraint, an object constraint, or a method constraint.

15. The computer system of claim 14 wherein the scope of the defined constraint is implied based on location in the program.

16. A computer-readable medium having thereon computer-executable instructions comprising:
   instructions for identifying defined constraints;
   instructions for evaluating constraints;

instructions for determining a set of variables accessed during constraint evaluation;

instructions for associating a constraint with the set of variables accessed during constraint evaluation;

instructions for, before a variable is updated and the constraint is re-evaluated, for a constraint which accesses the variable, removing associations of the constraint wit variables out of the set of variables accessed during evaluation of the constraint;

instructions for, after a variable is updated, for a conditional constraint which accesses the variable, associating the constraint with one or more new variables accessed during evaluation of the conditional constraint evaluation based on evaluation of a second branch through the constraint, the evaluation of the second branch caused by the variable being updated, wherein, the set of variables is changed to contain the one or more new variables as a result of re-establishing the constraint;

instructions for identifying program statements that access variables associated with constraints; and instructions for changing program flow so constraints are re-established at said identified program statements.

17. The computer-readable medium of claim 16, further comprising computer-executable instructions for updating plural variables in parallel.

18. The computer-readable medium of claim 16, further comprising computer-executable instructions for suspending constraint evaluations according to suspend resume token placement.

* * * * *

UNITED STATES PATENT AND TRADEMARK OFFICE
CERTIFICATE OF CORRECTION

| | | |
|---|---|---|
| PATENT NO. | : 7,500,226 B2 | Page 1 of 1 |
| APPLICATION NO. | : 10/792555 | |
| DATED | : March 3, 2009 | |
| INVENTOR(S) | : Nikolai Tillmann et al. | |

It is certified that error appears in the above-identified patent and that said Letters Patent is hereby corrected as shown below:

In column 19, line 7, in Claim 16, delete "wit" and insert -- with --, therefor.

Signed and Sealed this
Nineteenth Day of April, 2011

David J. Kappos
*Director of the United States Patent and Trademark Office*